May 23, 1933.  E. H. GREPPIN  1,909,947
OPERATING ROOM LIGHTING FIXTURE
Filed Feb. 6, 1929  3 Sheets-Sheet 2

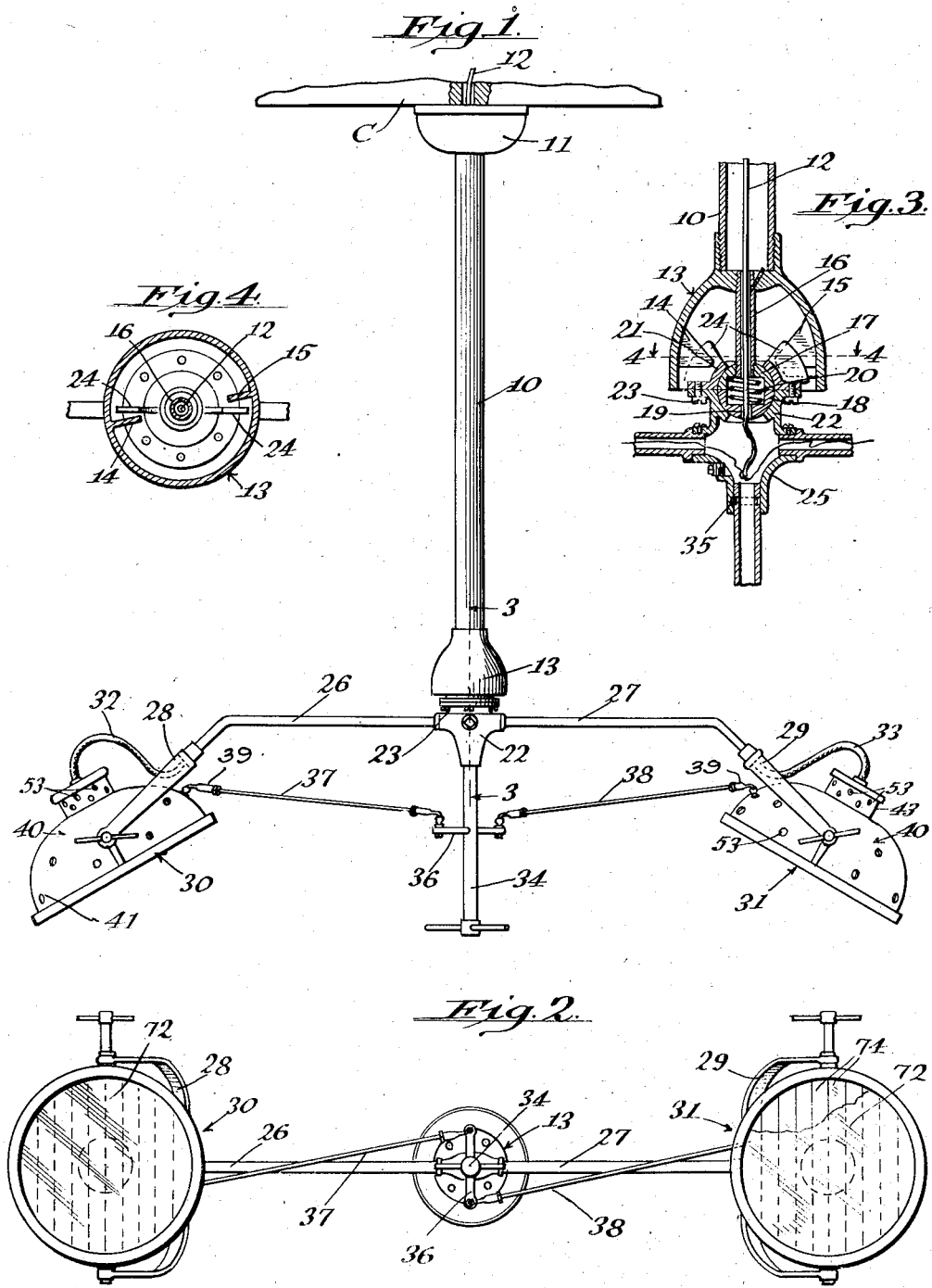

Inventor
Ernest H. Greppin
by Hazard and Miller
Attorneys.

May 23, 1933.  E. H. GREPPIN  1,909,947
OPERATING ROOM LIGHTING FIXTURE
Filed Feb. 6, 1929    3 Sheets-Sheet 3

Patented May 23, 1933

1,909,947

UNITED STATES PATENT OFFICE

ERNEST H. GREPPIN, OF LOS ANGELES, CALIFORNIA

OPERATING ROOM LIGHTING FIXTURE

Application filed February 6, 1929. Serial No. 337,839.

This invention relates to an illuminating device and particularly to that class of devices which have been primarily designed for illuminating operating tables in operating rooms and the like although it may be advantageously employed for other purposes as well.

An object of the invention is to provide a novel form of illuminating device which is so constructed as to throw the light received from a suitable light source onto the operating table or field in such a manner that practically no shadows or at least a minimum shadow will be cast on the field when an object is interposed between the light and the field.

Another object of the invention is to provide an illuminating device which is so constructed as to enable a plurality of various adjustments so that the light may be cast on the field by the fixture in the most advantageous manner.

A further object of the invention is to provide an improved illuminating device which is of simple and durable construction and which may have certain parts easily and quickly removed for purposes of repair and replacement.

Another object of the invention is to provide an improved illuminating fixture having lenses through which the light is thrown, which is formed of a heat absorbing material and to provide a construction whereby the lenses will not become damaged due to the expansion and contraction under the influence of heat of either the lenses or the reflector constituting a part of the fixture.

Another object of the invention is to provide an illuminating device having a novel form of reflector for receiving the light from a light source and reflecting it and scattering it over the field in such a manner that a minimum shadow will be produced so that the field will be adequately illuminated under practically all circumstances.

With the foregoing and other objects in view which will be made manifest in the following detailed description and specifically pointed out in the appended claims, reference is had to the accompanying drawings for an illustrative embodiment of the invention wherein:

Fig. 1 is a view in side elevation of the improved operating room lighting fixture.

Fig. 2 is a bottom plan view of the same.

Fig. 3 is a partial view in vertical section taken substantially upon the line 3—3 upon Fig. 1.

Fig. 4 is a horizontal section taken substantially upon the line 4—4 upon Fig. 3.

Figure 5:
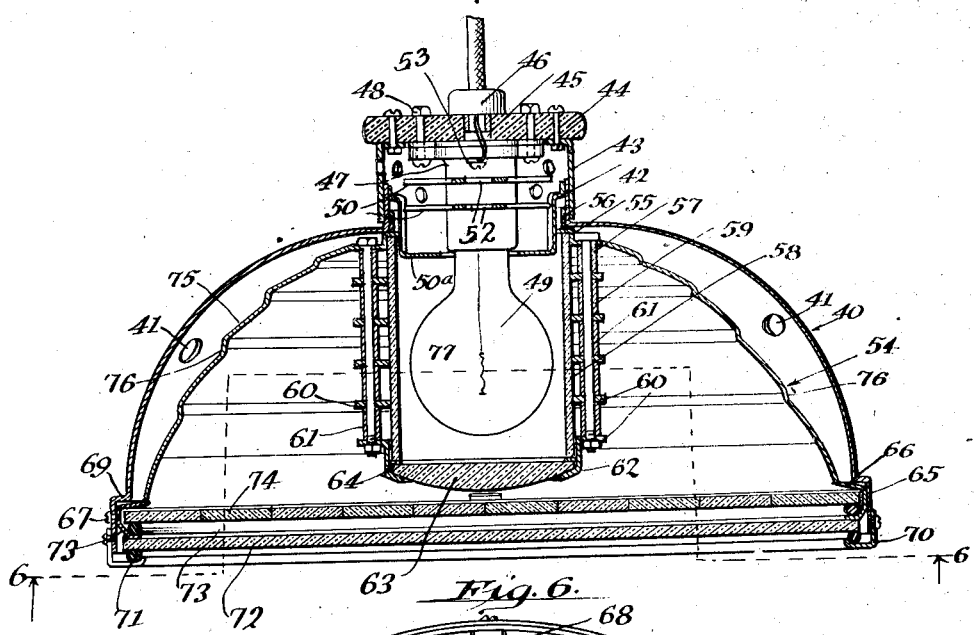
Fig. 5 is a vertical section through one of the lamps constituting a part of the improved lighting fixture.
Figure 6:
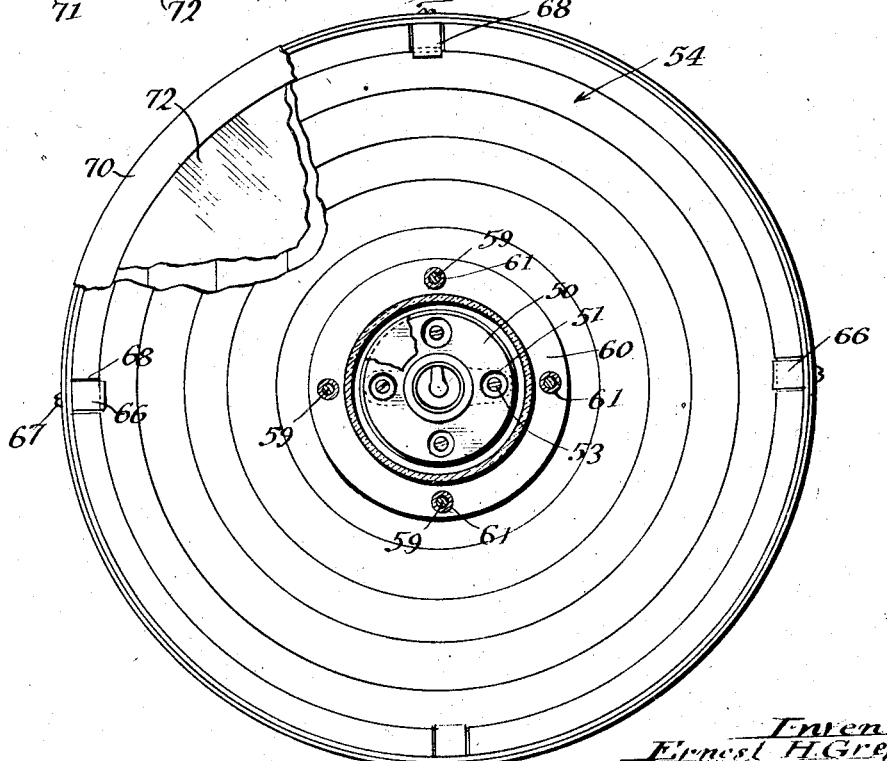
Fig. 6 is a sectional view taken substantially upon the line 6—6 upon Fig. 5 in the direction indicated, the lamp or globe being shown as having been removed.

Referring to the accompanying drawings wherein similar reference characters designate similar parts throughout, the improved lighting fixture comprises a hollow or tubular standard 10 which may be suspended from the ceiling C of an operating room or the like. This standard is provided at its upper end with a suitable fitting 11 and is adapted to have electrical conductors 12 pass downwardly through it. On the lower end of the standard 10 there is mounted a shroud 13 having an open bottom and a pair of internal opposed inwardly extending fins 14 and 15. These fins are arranged diametrically opposite each other. A nipple 16 is threaded into the top of the shroud through which the conductors 12 extend and on the lower end of the nipple there is screwed the upper half 17 of a ball. The lower half of the ball 18 has an aperture in its bottom indicated at 19 through which the conductors 12 extend and the two halves of the ball have opposed cylindrical recesses formed therein which cooperate to form a cylindrical chamber on the inside of the ball which encloses a compression spring 20. The coil spring 20 urges the two parts of the ball away from each other but they are enclosed in a socket formed of an upper socket part 21 and a lower socket part 22. These socket parts are provided with companion flanges fastened together as by screws 23. On the upper socket part 21 there are formed two diametrically opposed ribs 24 which are adapted to engage with the fins 14 and 15 to limit rotation of the socket on the ball to a half revolution. By the above described construction it will be appreciated that the ball is urged into expanded position within the socket, frictionally holding the socket in any adjusted position. It is possible, however, to tilt the socket with respect to the ball and to rotate it through one half of a revolution in adjusting the improved fixture. The rotation of the socket is limited to the half revolution so that there will be no danger of the conductors 12 becoming badly twisted and broken.

The lower socket part 22 carries with it a fitting 25 to which two diametrically opposed supporting arms 26 and 27 are fastened. These supporting arms have their outer ends bent downwardly in an inclined position and are provided with forks 28 and 29 respectively. The forks have rotatably mounted therein lamps generally indicated at 30 and 31 respectively, the details of which are to be subsequently described. The conductors 12 branch within the fitting 25 and extend outwardly through the hollow supporting arms 26 and 27 and are connected to the lamps as indicated at 32 and 33. A handle 34 is rotatably mounted in the bottom of the fitting 25 so as to have a swivelled connection therewith indicated at 35. This handle 34 extends downwardly from the fitting and carries a pair of opposed arms 36. Links 37 and 38 connect the ends of the arms 36 to the lamps 30 and 31 respectively and are provided with ball and socket joints 39 at their ends. On rotation of the handle 34 the inner ends of the links 37 and 38 will be pulled or pushed, as the case may be and the outer ends of the links will tilt the lamps 30 and 31 within their respective forks adjusting the lamps so that they may assume the inclined position shown in Fig. 1 or any intermediate position between such position and a horizontal position shown in Fig. 2.

Each of the lamps 30 and 31 comprises an outer shell or casing 40 which is apertured or perforated as indicated at 41 to permit the ingress and egress of air to facilitate cooling. The shell at its back has a central aperture formed by the tubular extension 42 on which is mounted in a detachable manner a tubular nipple 43. A bayonet joint construction is preferably employed to permit attachment and detachment of the nipple 43 to and from the tubular extension 42. The nipple 43 carries at its back a circular base 44 formed of insulating material having an aperture 45 therein through which the conductors 32 or 33, as the case may be, extend. A suitable ferrule or similar fitting 46 is employed to form a nice joint or connection between the conductors and the base 44. On the under side of the base 44 there is mounted a lamp socket 47 which is fastened in place by means of bolts 48 and which may be of any conventional construction so as to receive the base of the electric lamp or globe 49. On the lamp socket there are a plurality of metallic heat radiating rings or flanges 50 which have apertures 52 formed therein to permit the insertion of a screw driver to tighten the screws 53, some of which serve as binding posts for the ends of the conductors, supplying electric current to the electric lamp or globe 49. Other apertures in the heat radiating rings or flanges 50 enable the insertion of a screw driver to tighten the bolts 48 which fasten the socket to the base 44. The heat radiating rings are preferably fastened directly to the metallic part on the inside of the lamp socket in which the lamp fits. Heat rising from the lamp either on its interior or exterior is effectively radiated by these rings to prevent overheating of the socket. On the tubular extension 42 on the shell there is provided a flange 50ª which extends inwardly about the socket to prevent light from the lamp 49 escaping through the apertures 53 and shining against the ceiling. By the above described construction it will be appreciated that it is possible to detach the base 44 and nipple 43 from the shell or casing 40 carrying with it the associated structure so that it is relatively easy to replace the electric lamp or globe 49 in the event that the electric lamp or globe becomes burned out.

Within the shell or casing 40 there is disposed a reflector 54 which at its top or rear forms a shoulder 55 and a shoulder tubular extension 56 fitting within the tubular extension 42. On the shoulder 55 there is positioned a resilient gasket 57 which seats a translucent cylindrical member 58 extending forwardly therefrom and which encloses the electric lamp or globe 49. This member is preferably in the form of a glass cylinder which is of ground glass and serves to disperse and reflect light shining laterally from the filament in the electric lamp or globe 49. The ground glass cylinder prevents the reflector 54 from casting images of the filament of the electric lamp 49 onto the field. It will be understood that if images of the filament are cast on the field by the reflector that these images are apt to give the appearance of small shadows which are highly undesirable and by this construction a uniform light without shadows or images is thrown on the field. A plurality of bolts 59 are positioned through the back of the reflector 54 and extend forwardly adjacent the outside of the cylindrical dispersing or refracting member 58. Opaque louvers in the form of metallic rings 60 fit around the cylindrical dispersing member 58 and are receivable on the bolts 59. Spacers 61 fit about the bolts between the louvers and keep the louvers properly spaced. The purpose of the louvers is to confine the rays of light issuing from the cylindrical dispersing member 58 to relatively narrow streams of light which radiate outwardly toward the reflector 54. On the forward end of the bolts 59 there is mounted a bezel 62 which retains a lens 63 against a gasket 64 positioned on the forward end of the cylindrical dispersing member 58. Light emanating from the electric lamp or globe 49 and passing through the lens 63 will be refracted by the lens and dispersed over the field. The forward end of the shell or casing 40 is enlarged as indicated at 65 and in this enlarged position of the shell at suitable intervals there are secured U shaped spring members 66 which are fastened in place by screws 67. The inner ends of the spring members are disposed in notches 68 formed in the forward edge of the reflector 54 and they bear against the edges of the reflector. The forward edges of the reflector intermediate the notches 68 are bent outwardly to bear against the shoulder 69 formed at the forward end of the shell or casing 40. A bezel or retaining ring 70 is mounted on the forward end of the shell or casing 40 and is provided with a ring of resilient material 71 against which a glass lens 72 is positioned. This glass lens is unbroken and is circular in form. The outer ends of the spring members 66 bear against the inner face of the lens 72 urging it outwardly against the resilient ring 71. Against the inner sides of the outer ends of the spring 66 there is positioned a second ring of resilient material indicated at 73. A lens 74 fits between this ring 73 and the outwardly turned edges on the reflector 54. The lens 74 is made up of a plurality of parallel glass segments and both lenses 72 and 74 are preferably formed of a heat absorbing glass. By virtue of the fact that the lens 74 is innermost and absorbs most of the heat this lens is made up of segments so that the various segments may expand and contract due to changes in temperature independently of each other without danger of breaking. As most of the heat is absorbed by the inner lens 74 only a small proportion of heat is absorbed by the outer lens 72 and consequently it is unnecessary to make the outer lens 72 of segments. The construction of the spring clips 66 is such that they keep the outer lens 72 bearing against the resilient ring 71. At the same time these resilient spring members press the reflector 54 toward the rear of the shell or casing 40 keeping the reflector tight but at the same time permitting it to expand under the influence of heat without danger of damaging the lens 74.

Figure 7:
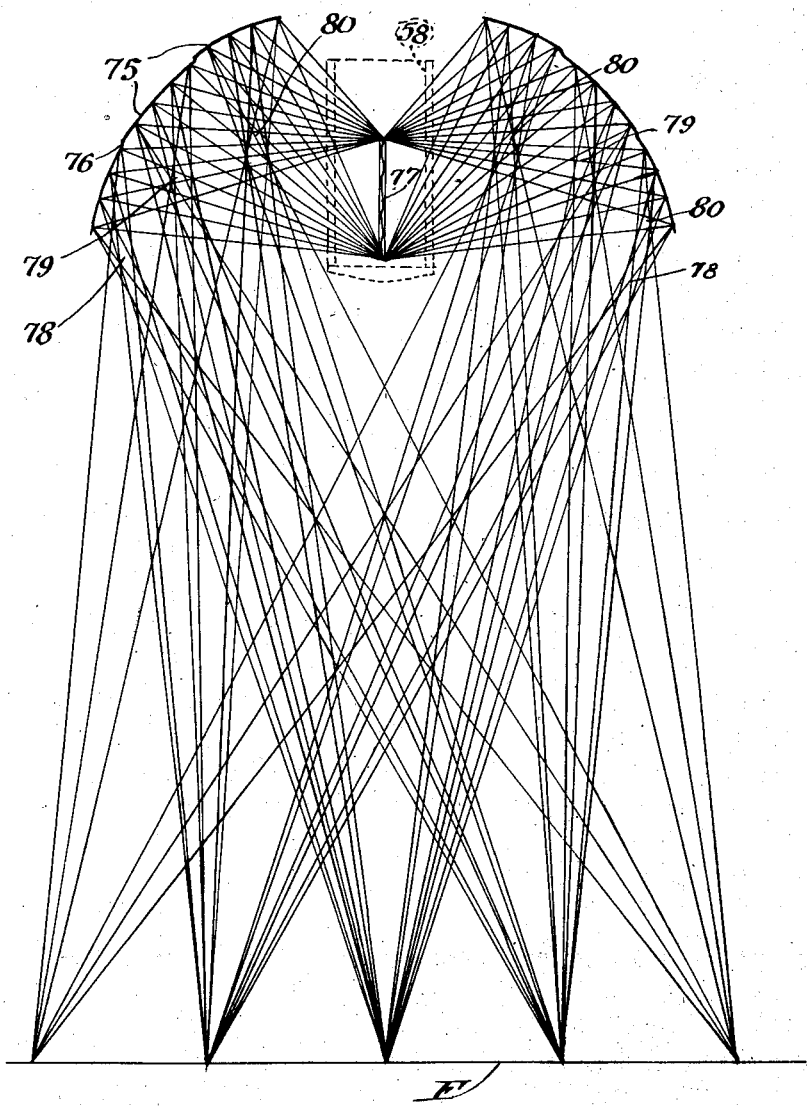
Fig. 7 is a diagrammatic view illustrating the manner in which the reflector is developed and the manner in which it receives light from the light source and disperses it over the field.

A feature of the invention resides in the development or construction of the reflector 54 which is so designed as to receive the light which passes laterally from the electric lamp or globe 49 between the louvers 60 and reflect it in such a manner that it will be dispersed over the field so that a minimum shadow will be produced on positioning an object between the reflector and the field. The details of the development of the reflector are illustrated on Figs. 5 and 7. As clearly shown upon these figures the reflector is formed of a plurality of segments 75 which are annular in form and which are connected to each other by means of connecting webs 76. The light filament in the electric lamp or globe 49 is assumed to be and is of an appreciable length. In other words no attempt is made to produce a reflector on the theory that a point source of light is possible. Each segment 75 of the reflector is so shaped that on receiving the light from the filament 77 it will reflect and disperse all of the light received by it over the entire field F. As clearly indicated on Fig. 7 various points on the reflector segment are selected with the lowermost point reflecting the light received from the filament 77 over onto the opposite side of the field. The uppermost point on each reflector segment 75 reflects the light received from the filament down onto the adjacent side of the field. As each segment of the reflector thus scatters the light over the entire field F it will be noted that every point on the field will receive rays of light from different points on the reflector and at different angles. Consequently if an object is interposed between the field and part of the reflector no noticeable shadow will be cast upon the field F as only some of the rays of light will be intercepted or cut off. The area on the field beneath the object remains adequately illuminated by rays of light which reach it in inclined directions from other points on the reflector so that in this manner the field remains adequately illuminated at all times which is highly essential in an operating room. As indicated by the various lines on Fig. 7 which represent typical rays of light emanating from the filament 77 and being reflected by the reflector each segment of the reflector received the light from the filament and reflects the various rays in such a manner that they converge upon a focus, the various foci being indicated at 78, 79 and 80. These foci are annular in form and extend around within the reflector 54. The rays of light then diverge from their respective foci downwardly onto the field. Light which strikes the connecting webs 76 on the reflector is scattered and may be considered as spill light. As these connecting webs are relatively small this spill light is negligible and merely serves to partially illuminate the vicinity surrounding the field which is intended to be illuminated by the lamp. The refraction of the lens 63 is such that the spread of the light shining therethrough is no greater than the spread of the light reflected from the reflector 54. In Fig. 7 but three reflector segments 75 and three foci are illustrated. It is to be understood, however, that in the actual construction of the reflector a larger number of segments are employed, each of which causes light to be reflected and converged upon its own focus. The three segments with their respective foci are illustrated on Fig. 7 so that the theory of construction of the reflector is readily apparent. From the above described construction of the reflector it will be appreciated that each lamp in and of itself is so constructed as to completely illuminate the field and cause a minimum shadow to be produced on the field when an object is interposed between the field and the lamp. As two lamps or a plurality of lamps of this character are employed in the improved lighting fixture, each of which illuminates the field from a different angle this effect of throwing a shadowless light on the field is multiplied or increased.

From the above described construction it will be appreciated that a novel and advantageous lighting fixture is produced which is designed for use in operating rooms or other locations where it is highly desirable that a shadowless light be thrown upon the field. Adjustments of the light are easily and quickly made to increase and decrease the intensity of the light at various locations but under all circumstances a minimum shadow which is hardly noticeable, if noticeable at all, is cast on the field.

Various changes may be made in the details of the construction without departing from the spirit or scope of the invention.

I claim:

1. An illuminating device of the character described having a light source, refracting means arranged forwardly of the light source adapted to disperse light received therefrom over the field, reflecting means arranged about the light source adapted to reflect light received from the light source upon the field, and a cylindrical dispersing refracting means arranged about the light source.

2. In an illuminating device of the character described, a stationary standard part, a movable supporting part, a split ball associated with the other part and containing the ball, and spring means for expanding the ball within the socket whereby frictional, rotational and tilting adjustment is permissible of the supporting part relatively to the standard part, and means limiting the rotational adjustment of the supporting part.

3. An illuminating device of the character described comprising a source of light, a cylindrical ground glass dispersing member surrounding the source of light, a refracting means mounted over the forward end of said dispersing member, louvers surrounding the dispersing member and spaced from each other, and reflecting means surrounding the louvers.

4. In an illuminating device of the character described a shell, a source of light removably mounted in the shell, a reflector mounted within the shell, a lens mounted in the forward end of the shell, and spring members mounted upon the shell engaging the reflector and lens, and serving to maintain the reflector and lens in proper position within the shell but permitting the reflector to expand and contract under the influence of heat without influencing or damaging the lens.

5. An illuminating device of the character described comprising a light source, reflecting means arranged about the light source, a light dispersing member between the light source and the reflecting means, and louvers arranged about the light dispersing member.

6. An illuminating device of the character described comprising a light source, means providing a series of separately defined annular reflecting surfaces about the light source, and means restricting the light radiating from the light source to the desired portions of the reflecting surfaces.

7. An illuminating device of the class described comprising a light source, reflecting means arranged about the light source, light transmitting means arranged adjacent the forward end of the reflecting means, refracting and dispersing means arranged between the light source and said light transmitting means, and cylindrical dispersing means surrounding the light source between the light source and said reflecting means.

8. An illuminating device of the class described comprising a light source, reflecting means arranged about the light source, light transmitting means arranged adjacent the forward end of the reflecting means, refracting and dispersing means arranged between the light source and said light transmitting means, dispersing means surrounding the light source between the light source and said reflecting means, and louvers arranged about the last mentioned dispersing means.

9. An illuminating device of the character described comprising a support, an arm on the support, a fork at the outer end of the arm, a lamp tiltably mounted in the fork, flexible conductors extending through the arm and supplying electric current to the lamp, a handle pivotally mounted at a point remote from the fork, and means connecting the lamp to the handle whereby upon movement of the handle the lamp may be tilted thereby.

In testimony whereof I have signed my name to this specification.

ERNEST H. GREPPIN.